(No Model.) 3 Sheets—Sheet 1.

J. H. ROWLAND.
VEHICLE WHEEL.

No. 424,579. Patented Apr. 1, 1890.

Witnesses:
Henry G. Dietrich
J. Thomson Cross

Inventor:
John H. Rowland,
per Henry ....
Att'ys.

(No Model.)   3 Sheets—Sheet 2.

J. H. ROWLAND.
VEHICLE WHEEL.

No. 424,579.   Patented Apr. 1, 1890.

Witnesses:
Henry S. Dietrich
J. Thomson Cross

Inventor:
John H. Rowland,
per
Atty's (No Model.) 3 Sheets—Sheet 3.

J. H. ROWLAND.
VEHICLE WHEEL.

No. 424,579. Patented Apr. 1, 1890.

Witnesses:
Henry G. Dieterich
Thomson Cross

Inventor:
John H. Rowland,
per Henry Orr
Att'ys.

UNITED STATES PATENT OFFICE.

JOHN HENRY ROWLAND, OF CARLTON, VICTORIA.

VEHICLE-WHEEL.

SPECIFICATION forming part of Letters Patent No. 424,579, dated April 1, 1890.

Application filed January 10, 1890. Serial No. 336,498. (No model.)

*To all whom it may concern:*

Be it known that I, JOHN HENRY ROWLAND, stair-builder, a subject of the Queen of Great Britain, residing at 152 Pelham Street, Carlton, in the British Colony of Victoria, have invented certain new and useful Improvements in and relating to Wheels for Buggies, Carriages, Lorries, and other Vehicles, of which the following is a specification.

This invention has been devised for the purpose of providing a comparatively simple and inexpensive wheel, which will be more satisfactory and reliable in use than are those of ordinary construction. Its essential features are:

First, that the hub consists of two hollow castings screwed together and fastened the one to the other by bolts passing through flanges formed on their inner ends, while the inner ends of the spokes of the wheel are adapted to be fitted into corresponding dovetails formed for the purpose in one of said castings.

Secondly, that an oil-hole is provided through a collar on the axle on the inner side of the wheel, while an oil-groove leads from said oil-hole in said collar along the upper side of said axle and conveys the oil to and distributes it evenly within the bearings of the wheel. This oil-hole is covered by a box secured to the axle and provided with an easily-raised lid.

Thirdly, that a solid removable bush or sleeve is employed in combination with a hollow hub constructed substantially as hereinbefore mentioned.

Fourthly, that the axle-cap is provided with a certain cam arrangement adapted to shoot a pair of outwardly-sliding bolts into a groove or other socket or sockets formed on the inside of the outer half of the hub, so that said cap will be secured thereby and will effectually be prevented from unscrewing, while it will prevent the usual nut upon the end of the axle from shaking off.

Figure 1:
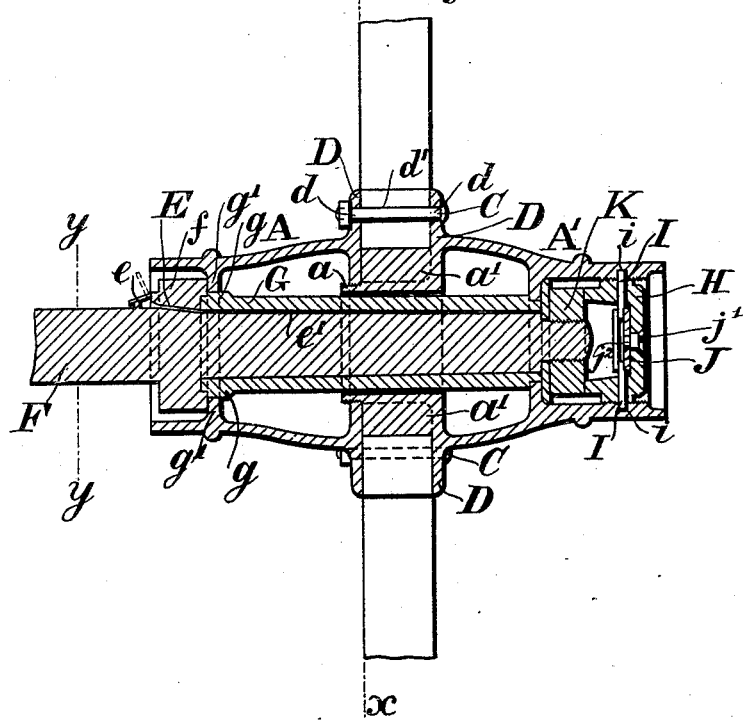
Figure 2:
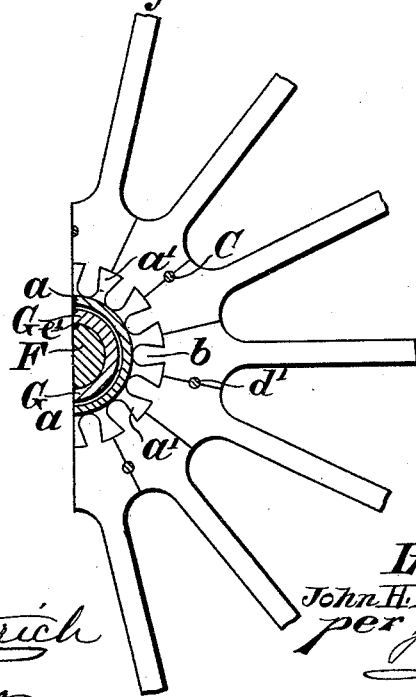
Figure 3:
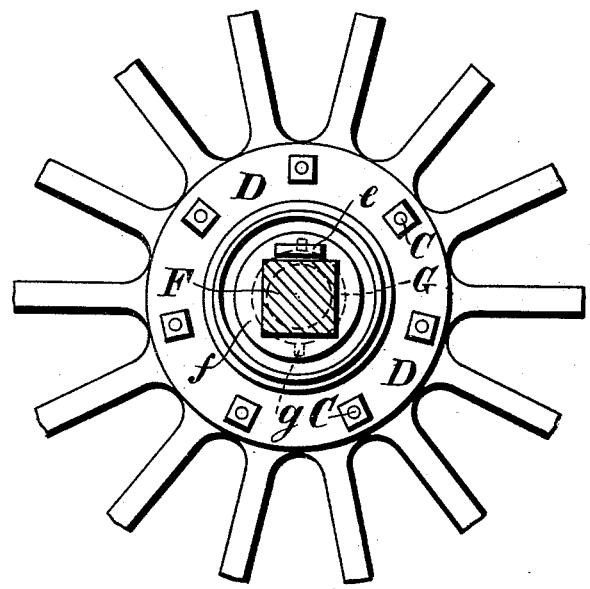
Figure 4:
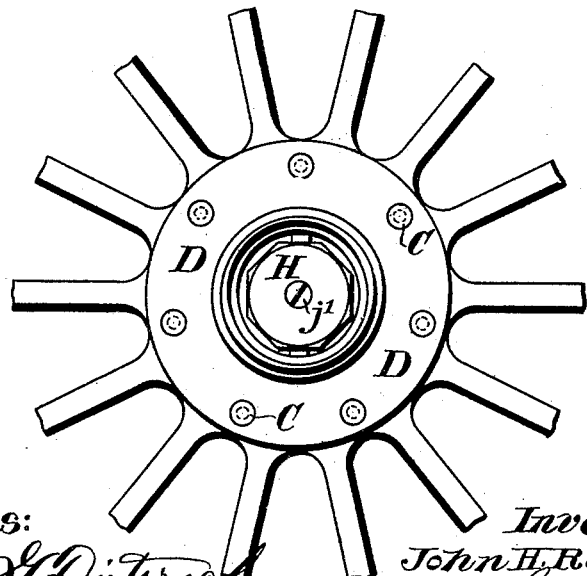
Figure 5:
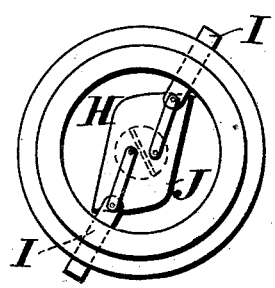
Figure 6:
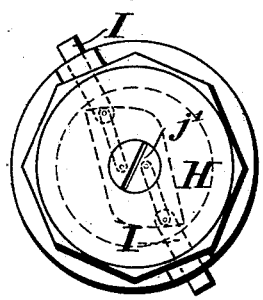
Figure 7:
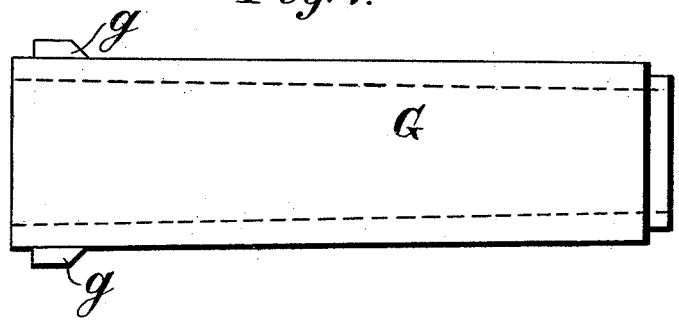
Figure 8:
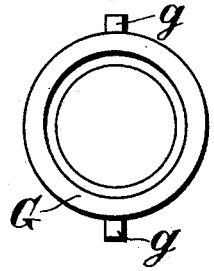
Figure 9:
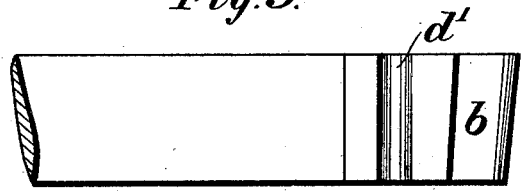
Figure 10:

Referring to the accompanying drawings, Figure 1 is a vertical central longitudinal section of the hub and inner ends of the spokes of a wheel constructed according to my invention. Fig. 2 is a vertical transverse section on line $x\ x$, Fig. 1. Fig. 3 is a vertical transverse section on line $y\ y$, Fig. 1. Fig. 4 is an elevation of the outside of the hub of my improved wheel. Figs. 5 and 6 are elevations, respectively, of the inner and outer sides of a screw-cap for carriage and other wheels constructed according to my invention. Figs. 7 and 8 are respectively a side elevation and an end elevation of the removable bush or sleeve of my improved wheel, while Figs. 9 and 10 are respectively a side elevation and an end view of one of the spokes thereof.

The hub of my improved wheel consists of a pair of hollow castings A A', preferably of malleable iron or steel, which are preferably screwed the one to the other, as shown at $a$, Fig. 1. One of these two castings—say, for instance, the outer one A'—is provided with a number of dovetail grooves or sockets $a'\ a'$, adapted each to receive one of the correspondingly-shaped ends $b\ b$ of the spokes B, as clearly illustrated in Figs. 1 and 2. These two hollow castings A A' are secured the one to the other by bolts C, passing through holes $d$, formed in the flanges D on their inner ends, as well as through holes $d'$, Figs. 1, 2, and 9, formed between each of the inner ends of the spokes B. An oil-hole E passes through the collar $f$ on the axle F of the vehicle, and is provided with a cap $e$, while a groove $e'$ is formed along the top of said axle and serves to convey the oil to the center of the wheel, thereby insuring a far better lubrication of said wheel, and at the same time preventing the entrance of grit or dirt.

The bushing of my improved wheel consists, simply, of a slightly-tapering sleeve or bush G, Figs. 1, 2, 3, 7, and 8, driven into the center of the hub of the wheel, as shown in Fig. 1, and prevented from turning therein by the projections or feathers $g$, engaging in grooves or recesses cut or otherwise formed in an inwardly-projecting annular web $g'$, provided inside the hollow casting A.

The axle-cap H, Figs. 1, 4, 5, and 6, is first screwed into and is then secured within the end of the hollow casting A' by means of a pair of outwardly-projecting bolts I I, which are connected by links $j\ j$ to and are arranged to be forced outwardly by a suitably-shaped cam J, pivoted centrally within said cap and capable of being partially rotated by means of a saw cut or nick $j'$, cut across the outer end of its spindle $j^2$. These bolts I I when projected are adapted to engage in a circular groove $i\,i$, formed around the inside of the outer portion of the casting A', whereby the cap H will be effectually kept in its place in said casting, and will therefore prevent the usual nut K on the end of the axle from shaking off.

Having now particularly described and ascertained the nature of my invention and in what manner the same is to be performed, I declare that what I claim is—

1. In a vehicle-wheel, a hub composed of two sections adapted to be screwed together, one of said sections being provided with radial spoke-mortises, the diameter of which is greater at the inner than at the outer end, in combination with spokes having a correspondingly-shaped inner end, whereby an interlocking-joint is formed between the hub-mortises and the spokes, and bolts $d'$, extending through both sections and between the adjacent inner end of two spokes, whereby the hub-sections are more firmly held together and the spokes interlocked, substantially as and for the purposes specified.

2. In a vehicle-wheel, a hub composed of two sections adapted to be rigidly connected, said sections being constructed to form a tubular bearing at their point of connection and at the outer end of the hub, the inner section being provided with an inwardly-projecting flange, in which are formed two recesses, and the bushing G, seated in said bearings and provided at its inner end with locking-flanges adapted to engage the recesses in the flange of the inner hub-section, in combination with the axle F, provided with an annular flange having a recess in its front face for the reception of the inner end of the bushing, said axle-flange bearing against the inwardly-projecting flange of the inner hub-section, an oil-duct formed in said axle extending from the outer end of the bushing to the rear face of the axle-flange and terminating in a cup-like enlargement formed on the axle, and a cover hinged to said cup-like enlargement to close the same, substantially as and for the purposes specified.

3. In a vehicle-wheel, the combination, with the hub, the axle, and the retaining-nut for said axle, of an axle-cap and a locking device for locking the cap to the hub, comprising a locking bolt or bolts adapted to engage a groove formed in said hub, substantially as and for the purposes specified.

4. In a vehicle-wheel, the combination, with the hub, the axle, and the retaining-nut for said axle, of an axle-cap and a locking device for locking the cap to the hub, consisting of two locking-bolts adapted to engage the hub, a revoluble cam, and a link-connection between the bolts and cam, substantially as and for the purposes specified.

5. In a vehicle-wheel, the combination, with the hub, the axle, and the retaining-nut for said axle, said hub being provided in its outer end with an annular groove, of an axle-cap provided with an axial bearing, a cam revoluble in said bearing, and locking-bolts adapted to engage the groove in the hub, and a link-connection between the cam and bolts, substantially as and for the purposes specified.

JOHN HENRY ROWLAND.

Witnesses:
 WALTER SMYTHE BAYSTON,
 WALTER CHARLES HART.